US009874161B2

(12) United States Patent
Sommerhoff et al.

(10) Patent No.: US 9,874,161 B2
(45) Date of Patent: Jan. 23, 2018

(54) EXHAUST-GAS-TURBOCHARGED APPLIED-IGNITION INTERNAL COMBUSTION ENGINE HAVING AT LEAST TWO TURBINES, AND METHOD FOR OPERATING AN INTERNAL COMBUSTION ENGINE OF SAID TYPE

(71) Applicant: Ford Global Technologies, LLC, Dearborn, MI (US)

(72) Inventors: Franz Arnd Sommerhoff, Aachen (DE); Frank Kraemer, Neunkirchen-Seelscheid (DE); Franz J. Brinkmann, Huerth-Efferen (DE); Helmut Matthias Kindl, Aachen (DE); Vanco Smiljanovski, Bedburg (DE); Joerg Kemmerling, Monschau (DE); Werner Willems, Aachen (DE); Carsten Weber, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 14/692,103

(22) Filed: Apr. 21, 2015

(65) Prior Publication Data
US 2015/0322897 A1 Nov. 12, 2015

(30) Foreign Application Priority Data
May 9, 2014 (DE) .................. 10 2014 208 702

(51) Int. Cl.
*F02D 41/00* (2006.01)
*F02M 25/07* (2006.01)
(Continued)

(52) U.S. Cl.
CPC ........ *F02D 41/0007* (2013.01); *F02B 37/001* (2013.01); *F02B 37/002* (2013.01);
(Continued)

(58) Field of Classification Search
CPC ....... Y02T 10/144; Y02T 10/18; Y02T 10/42; Y02T 10/47; F02D 41/0007; F02D 2041/001; F02D 41/0087; F02D 13/0242
See application file for complete search history.

(56) References Cited

U.S. PATENT DOCUMENTS

| | | | |
|---|---|---|---|
| 8,091,357 B2 * | 1/2012 | Robel | F02D 13/0249 123/562 |
| 2006/0070382 A1 * | 4/2006 | Karlsson | F02B 37/001 60/612 |
| 2012/0240572 A1 * | 9/2012 | Schorn | F02B 37/007 60/602 |

FOREIGN PATENT DOCUMENTS

| | | |
|---|---|---|
| DE | 3439999 C1 | 5/1986 |
| DE | 10229116 A1 | 1/2003 |

(Continued)

OTHER PUBLICATIONS

Kemmerling, J et al., "Boosted Internal Combustion Engine with Partial Deactivation and Method for the Operation of an Internal Combustion Engine of Said Type," U.S. Appl. No. 14/604,467, filed Jan. 23, 2015, 39 pages.

*Primary Examiner* — Sizo Vilakazi
(74) *Attorney, Agent, or Firm* — Julia Voutyras; McCoy Russell LLP (57) ABSTRACT

A method for operating a boosted internal combustion engine is provided. The engine includes a first cylinder in a first cylinder group and a second cylinder in a second cylinder group, each of the first and second cylinders having two activatable outlet openings adjoined by an exhaust line, one of the outlet openings of each of the first and second cylinders coupled to a first turbocharger including a first turbine and one of the outlet openings of each of the cylinders coupled to a second turbocharger including a second turbine, the method comprising: if engine load is less (Continued)

than a threshold load value implementing a first operating mode that includes deactivating the second cylinder, deactivating one of the activatable outlet openings in the first cylinder, and activating one of the activatable outlet opening in the first cylinder.

6 Claims, 4 Drawing Sheets

(51) Int. Cl.
| | | |
|---|---|---|
| *F02D 17/02* | (2006.01) | |
| *F02B 37/00* | (2006.01) | |
| *F02B 37/007* | (2006.01) | |
| *F01N 3/04* | (2006.01) | |
| *F01N 13/10* | (2010.01) | |
| *F01L 13/00* | (2006.01) | |

(52) U.S. Cl.
CPC ............ *F02B 37/007* (2013.01); *F02D 17/02* (2013.01); *F02D 41/0087* (2013.01); *F02M 25/0711* (2013.01); *F02M 25/0717* (2013.01); *F02M 25/0739* (2013.01); *F02M 25/0748* (2013.01); *F01L 13/0005* (2013.01); *F01N 3/046* (2013.01); *F01N 13/105* (2013.01); *F01N 13/107* (2013.01); *Y02T 10/144* (2013.01)

(56) References Cited

FOREIGN PATENT DOCUMENTS

| | | |
|---|---|---|
| DE | 102008036308 A1 | 2/2010 |
| DE | 202014100426 U1 | 3/2014 |

* cited by examiner

EXHAUST-GAS-TURBOCHARGED APPLIED-IGNITION INTERNAL COMBUSTION ENGINE HAVING AT LEAST TWO TURBINES, AND METHOD FOR OPERATING AN INTERNAL COMBUSTION ENGINE OF SAID TYPE

CROSS-REFERENCE TO RELATED APPLICATION

This application claims priority to German Patent Application Serial No. 102014208702.3, filed on May 9, 2014, the entire contents of which are hereby incorporated by reference for all purposes.

FIELD

The present disclosure relates a boosted internal combustion engine with having deactivatable outlet openings and a method for operation of the boosted internal combustion engine.

BACKGROUND AND SUMMARY

Engine can include multiple boosting devices such as turbochargers or superchargers. For instance, turbochargers may be arranged in a parallel configuration to enable efficient boosting to be provided over a wider range of engine speeds and loads. However, it may be desirable to deactivate a portion of the cylinders in the engine when a large amount of engine output is not needed. However, shutting down a portion of the cylinders in a boosted engine may interfere with boosting operation.

As such in one approach, a method for operating a boosted internal combustion engine is provided. The engine includes a first cylinder in a first cylinder group and a second cylinder in a second cylinder group, each of the first and second cylinders having two activatable outlet openings adjoined by an exhaust line, one of the outlet openings of each of the first and second cylinders coupled to a first turbocharger including a first turbine and one of the outlet openings of each of the cylinders coupled to a second turbocharger including a second turbine, the method comprising: if engine load is less than a threshold load value implementing a first operating mode that includes deactivating the second cylinder, deactivating one of the activatable outlet openings in the first cylinder, and activating one of the activatable outlet opening in the first cylinder. In this way, a portion of the cylinders can be deactivated and a portion of the active cylinder's outlets can be deactivated. As a result, specific cylinder outlets can be activated and deactivated based on engine load to increase engine efficiency and specifically turbocharger efficiency, thereby improving engine operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A boosted applied-ignition internal combustion engine is described herein. The Engine may have at least one cylinder head with at least two cylinders, in which each cylinder has at least two outlet openings for the discharge of the exhaust gases, at least one of which is in the form of an activatable outlet opening, each outlet opening being adjoined by an exhaust line for the discharge of the exhaust gases via an exhaust-gas discharge system, at least two exhaust-gas turbochargers are provided, each exhaust-gas turbocharger comprising a turbine arranged in the exhaust-gas discharge system, and the exhaust lines of the at least two cylinders are configured such that the exhaust line of an activatable outlet opening of each cylinder issues into a first overall exhaust line, forming a first exhaust manifold, said first overall exhaust line being connected to the turbine of a first exhaust-gas turbocharger, and the exhaust lines of the other outlet openings of the at least two cylinders merging to form a second overall exhaust line, forming a second exhaust manifold, said second overall exhaust line being connected to the turbine of a second exhaust-gas turbocharger.

A method for operating an internal combustion engine is also described herein. Within the context of the present invention, the expression "applied-ignition internal combustion engine" encompasses Otto-cycle engines but also hybrid internal combustion engines, which utilize a hybrid combustion process, and hybrid drives which comprise not only the applied-ignition internal combustion engine but also an electric machine which is connectable in terms of drive to the internal combustion engine and which receives power from the internal combustion engine or which, as a switchable auxiliary drive, outputs power in addition.

Internal combustion engines have a cylinder block and at least one cylinder head which are connected to one another at an assembly end side to form the cylinders. To control the charge exchange, an internal combustion engine requires control elements—generally in the form of lifting valves—and actuating devices for actuating these control elements. The valve actuating mechanism desired for the movement of the valves, including the valves themselves, may be referred to as the valve drive. The cylinder head often serves to accommodate the valve drive.

During the charge exchange, the combustion gases are discharged via the outlet openings of the cylinders and the charging with charge air takes place via the inlet openings. It is the object of the valve drive to open and close the inlet and outlet openings at desired times, with a fast opening of a large flow cross sections being sought in order to keep the throttling losses in the inflowing and outflowing gas flows low and in order to provide increased charging and an effective (e.g., complete) discharge of the exhaust gases. In previous engines, the cylinders may be provided with two or more inlet and outlet openings.

In previous engines, the exhaust lines which adjoin the outlet openings can be at least partially integrated in the cylinder head. The exhaust lines of the cylinders are generally merged to form one common overall exhaust line, or else—as in the internal combustion engine described herein—in groups to form two or more overall exhaust lines. The merging of exhaust lines to form an overall exhaust line is referred to generally, and within the context of the present invention, as an exhaust manifold.

Downstream of the manifold, the exhaust gases in the engine described herein, supplied, for the purpose of boosting the internal combustion engine, to the turbines of at least two exhaust-gas turbochargers. The advantages of an exhaust-gas turbocharger for example in relation to a mechanical charger are that no mechanical connection for transmitting power exists or is required between the charger and internal combustion engine. While a mechanical charger extracts the energy needed for driving it from the internal combustion engine, and thereby reduces the output power and consequently adversely affects the efficiency, the exhaust-gas turbocharger utilizes the exhaust-gas energy of the hot exhaust gases. An exhaust-gas turbocharger arranged in the exhaust-gas discharge system however results in increased exhaust-gas back pressure upstream of the turbine, which can have an adverse effect on the charge exchange.

An exhaust-gas turbocharger may include a compressor and a turbine which are arranged on the same shaft. The hot exhaust-gas flow is supplied to the turbine of the charger and expands in said turbine with a release of energy. The shaft is thus set in rotation. The energy supplied by the exhaust-gas flow to the turbine and ultimately to the shaft is used for driving the compressor which is likewise arranged on the shaft. The compressor delivers and compresses the charge air supplied to it, as a result of which boosting of the at least two cylinders is obtained. A charge-air cooling arrangement may be provided, where the compressed charge air may be cooled before it enters the cylinders.

Boosting serves increase the power of the internal combustion engine. Here, the air needed for the combustion process is compressed, as a result of which a greater air mass can be supplied to each cylinder per working cycle. In this way, the fuel mass and therefore the mean pressure can be increased. Boosting is a suitable way to increase the power of an internal combustion engine while maintaining an unchanged swept volume, or for reducing the swept volume while maintaining the same power. In any case, boosting can lead to an increase in volumetric power output and an improved power-to-weight ratio. For the same vehicle boundary conditions, it is thus possible to shift the load collective toward higher loads, at which the specific fuel consumption is lower.

The configuration of the exhaust-gas turbocharging often poses difficulties, wherein it is desirable to have a noticeable performance increase in all rotational speed ranges. In previous engines, a severe torque drop is however observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio likewise decreases, which equates to a torque drop.

It would fundamentally be possible for the drop in charge pressure to be counteracted by means of a reduction in the size of the turbine cross section, and the associated increase in the turbine pressure ratio. This however merely shifts the torque drop further in the direction of lower rotational speeds. Furthermore, said approach, that is to say the reduction in size of the turbine cross section, is subject to limits because the desired boosting and performance increase should be possible without restriction even at high engine speeds, that is to say in the case of high exhaust-gas flow rates.

It may be desirable to improve the torque characteristic of a boosted internal combustion engine using various measures. This can be achieved for example by a small design of the turbine cross section and simultaneous provision of an exhaust-gas blow-off facility. Such a turbine is also referred to as a wastegate turbine. If the exhaust-gas mass flow exceeds a critical value, a part of the exhaust-gas flow is, within the course of the so-called exhaust-gas blow-off, conducted via a bypass line past the turbine. Said approach has the disadvantage that the boosting behavior is inadequate at relatively high engine speeds or in the case of relatively large exhaust-gas flow rates.

The torque characteristic of a boosted internal combustion engine may furthermore be improved by use of multiple turbochargers arranged in parallel, that is to say by use of multiple turbines of relatively small turbine cross section arranged in parallel, wherein turbines are activated successively with increasing engine speed or increasing exhaust-gas flow rate, in accordance with so-called sequential boosting.

A boosted internal combustion engine having at least two turbines arranged in parallel is described herein. One turbine, specifically the turbine of a first exhaust-gas turbocharger, is in this case in the form of an activatable turbine which can be acted on with exhaust gas, that is to say activated, in the presence of relatively high engine speeds or relatively large exhaust-gas flow rates.

To be able to deactivate or activate, that is to say switch, said first switchable turbine, a switching device can be provided. In the present case, the valve drive can perform the function of a switching device. For this purpose, each cylinder can be equipped with at least two outlet openings, at least one of which is in the form of an activatable outlet opening. In this case, the exhaust lines of the cylinders are configured such that the exhaust line of an activatable outlet opening of each cylinder issues into a first overall exhaust line, thus forming a first exhaust manifold, said first overall exhaust line being connected to the turbine of the first exhaust-gas turbocharger, and the exhaust lines of the other outlet openings of the cylinders merge to form a second overall exhaust line, thus forming a second exhaust manifold, said second overall exhaust line being connected to the turbine of a second exhaust-gas turbocharger.

A deactivation of the activatable outlet openings whose exhaust lines merge to form the first overall exhaust line, thus forming the first exhaust manifold, may be provided to cut off the turbine of the first exhaust-gas turbocharger from the exhaust-gas supply, whereby said turbine is deactivated. The activatable outlet openings are opened during the course of the charge exchange, and the switchable turbine thereby activated, that is to say acted on with exhaust gas, only in the presence of relatively large exhaust-gas flow rates or relatively high engine speeds.

In this way, the torque characteristic of the internal combustion engine can be improved considerably; in particular, the torque at low engine speeds, that is to say in the presence of low exhaust-gas flow rates, can be noticeably increased.

In one example, the switching device may be jointly formed by the valve drive and may not be arranged in the exhaust-gas discharge system or in the first turbine itself has the advantage that said switching device, aside from the respective outlet valve, is not subject to high thermal loading. There is thus a decreased risk (e.g., no risk) of a malfunction or leakage of the switching device. The expected service life of the switching device is increased. Furthermore, a valve drive may be provided in any case for performing the charge exchange, such that no additional switching device has to be provided. The already existing valve drive may be designed to be switchable or variable.

As previously discussed, a boosted applied-ignition internal combustion engine and method for operating said engine is described herein. In one example, a boosted applied-ignition internal combustion engine having at least one cylinder head with at least two cylinders, in which each cylinder has at least two outlet openings for the discharge of the exhaust gases, at least one of which is in the form of an activatable outlet opening, each outlet opening being adjoined by an exhaust line for the discharge of the exhaust gases via an exhaust-gas discharge system, at least two exhaust-gas turbochargers are provided, each exhaust-gas turbocharger comprising a turbine arranged in the exhaust-gas discharge system, and the exhaust lines of the at least two cylinders are configured such that the exhaust line of an activatable outlet opening of each cylinder issues into a first overall exhaust line, thus forming a first exhaust manifold, said first overall exhaust line being connected to the turbine of a first exhaust-gas turbocharger, and the exhaust lines of the other outlet openings of the at least two cylinders merging to form a second overall exhaust line, thus forming a second exhaust manifold, said second overall exhaust line being connected to the turbine of a second exhaust-gas turbocharger, and wherein at least two cylinders are configured in such a way that they form at least two cylinder groups with in each case at least one cylinder, wherein the at least one cylinder of a first cylinder group is a cylinder which is operational even in the event of a partial deactivation of the internal combustion engine, and the at least one cylinder of a second cylinder group is formed as a load-dependently switchable cylinder, and all of the outlet openings of the at least one cylinder of the second cylinder group are in the form of activatable outlet openings.

The internal combustion engine described herein may include turbines arranged in parallel, which noticeably improve the torque availability in particular in the low engine speed range through successive switching, but furthermore also exhibits so-called partial deactivation.

One approach for increasing efficiency, that is to say for reducing fuel consumption, is cylinder deactivation, that is to say the deactivation of individual cylinders in certain load ranges.

The efficiency of an Otto-cycle engine in part-load operation can be improved, that is to say increased, via partial deactivation because the deactivation of one cylinder of a multi-cylinder internal combustion engine increases the load on the other cylinders, which remain in operation, if the engine power remains substantially constant, such that the throttle flap can be opened further in order to introduce a greater air mass into said cylinders, whereby dethrottling of the internal combustion engine is attained overall. During the partial deactivation, the cylinders which are permanently in operation operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied, and tolerate higher exhaust-gas recirculation rates.

Further advantages with regard to efficiency are attained in that a deactivated cylinder, owing to the absence of combustion, does not generate any wall heat losses owing to heat transfer from the combustion gases to the combustion chamber walls.

To realize a partial deactivation, the at least two cylinders of the internal combustion engine may be configured to form at least two cylinder groups with in each case at least one cylinder. The at least one cylinder of a first cylinder group is a cylinder which is operational even during partial deactivation of the internal combustion engine, and the at least one cylinder of a second cylinder group is in the form of a load-dependently switchable cylinder.

Furthermore, all of the outlet openings of the at least one cylinder of the second cylinder group may be in the form of activatable outlet openings, such that, during partial deactivation, the second cylinder group can be completely separated from the exhaust-gas discharge system, that is to say does not deliver exhaust gas into the exhaust-gas discharge system.

Aside from the partial deactivation operating mode, the internal combustion engine described herein makes it possible to implement a second operating mode in which the turbine of the second exhaust-gas turbocharger is acted on with exhaust gas from the at least two cylinders of the internal combustion engine and the turbine of the first exhaust-gas turbocharger is deactivated, for which purpose the activatable outlet openings of the cylinders whose exhaust lines issue into the first overall exhaust line are deactivated. Then, in a third operating mode, the two turbines of the at least two exhaust-gas turbochargers are acted on with exhaust gas from the cylinders of the internal combustion engine. For this purpose, all of the activatable outlet openings are activated and actuated.

The internal combustion engine described herein thus makes it possible to realize both the improvement in the torque characteristic, in particular at low engine speeds, and also higher efficiency, that is to say lower fuel consumption.

The internal combustion engine described herein achieves improved boosting with regard to its operating behavior.

Embodiments of the internal combustion engine may be provided in which the at least one cylinder of the first cylinder group has only one activatable outlet opening, the exhaust line of which issues into the first overall exhaust line. This embodiment satisfies the minimum requirements that must be placed on the first cylinder group and its outlet openings in order that the first turbine can be deactivated. Specifically, for this purpose, the cylinders of the first cylinder group must have at least one activatable outlet opening, wherein this relates, or must relate, to those outlet openings whose exhaust lines issue into the first overall exhaust line.

Embodiments of the internal combustion engine may also be provided where all of the outlet openings of the at least one cylinder of the first cylinder group are in the form of activatable outlet openings. This embodiment makes allowance for the fact that the cylinders of the first cylinder group may also be equipped (e.g., exclusively equipped) with activatable outlet openings, and this in particular does not oppose the implementation of the method described herein.

Embodiments of the internal combustion engine may be provided where the exhaust lines of the at least two cylinders merge to form overall exhaust lines within the cylinder head.

The integration of the exhaust manifolds into the cylinder head reduces the mass and the length of the exhaust-gas discharge systems from the outlet openings to the turbines and the exhaust-gas aftertreatment systems. In this way, the exhaust-gas enthalpy of the hot exhaust gases can be utilized (e.g., optimally utilized), and fast response behavior of the turbochargers can be enabled. Furthermore, exhaust-gas aftertreatment systems arranged downstream reach their operating temperature or light-off temperature quickly, in particular after a cold start of the internal combustion engine. Furthermore, the integration of the exhaust manifolds into the cylinder head permits the dense packaging of the drive unit. If appropriate, the exhaust manifolds may benefit from a liquid-type cooling arrangement provided in the cylinder head, in such a way that the manifolds do not have to be manufactured from materials that are resistant to high temperatures, if desired.

In the case of boosted internal combustion engines having at least two cylinders in an in-line arrangement along a longitudinal axis of the cylinder head, where the at least one cylinder head can be connected, at an assembly end side, to a cylinder block, embodiments may be provided wherein one overall exhaust line is arranged on that side of another overall exhaust line which faces away from the assembly end side.

In the above embodiment, the two exhaust manifolds are situated at least partially one above the other, that is to say with a spacing to one another in the direction of a cylinder longitudinal axis, because one overall exhaust line is arranged on that side of the other overall exhaust line which faces away from the assembly end side.

If the at least two cylinders are in an in-line arrangement along a longitudinal axis of the cylinder head, embodiments of the internal combustion engine may be provided where the at least two overall exhaust lines are arranged so as to be offset, with the formation of a spacing, along the longitudinal axis of the cylinder head.

In the present case, the overall exhaust lines may be arranged so as to be offset along the longitudinal axis of the cylinder head with the formation of a spacing A. The offset permits a compact design of the cylinder head and simultaneously ensures that the overall exhaust lines have an adequately large spacing to one another. In this way, a desired amount of structural space remains between the overall exhaust lines despite the compact design, by contrast to embodiments where the overall exhaust lines do not have an offset along the cylinder head longitudinal axis. This also facilitates the arrangement of coolant ducts in the cylinder head between the two overall exhaust lines if a liquid-type cooling arrangement is provided.

In the case of boosted internal combustion engines having at least four cylinders in an in-line arrangement along a longitudinal axis of the cylinder head, embodiments may be provided wherein the outer cylinders form one cylinder group and the at least two inner cylinders form another cylinder group.

Embodiments of the internal combustion engine may be provided where the overall exhaust lines merge to form a common exhaust line downstream of the turbines. It is then possible, if desired, for exhaust-gas aftertreatment of all of the exhaust gas from the at least two cylinders to be performed jointly, specifically by way of an exhaust-gas aftertreatment system arranged in the common exhaust line. This may for example be a particle filter, an oxidation catalytic converter and/or an exhaust-gas aftertreatment system for the reduction of nitrogen oxides.

Alternatively or in addition, an exhaust-gas aftertreatment system, and also possibly multiple exhaust-gas aftertreatment systems, may also be provided in each overall exhaust line.

This permits a more close-coupled arrangement of the exhaust-gas aftertreatment systems, that is to say close to the outlet openings of the cylinders. This embodiment also makes allowance for the fact that the turbines that are provided are, to some extent, operated at different operating points. For example, the load-dependently switchable cylinders are may be activated in the presence of relatively high loads, at which the exhaust gas is at a high or relatively high temperature, whereas the cylinders that are operational even during partial deactivation of the internal combustion engine are also acted on with exhaust gas during part-load operation, when said exhaust gas is at a lower temperature, in one example. Different exhaust-gas aftertreatment systems may be desired for different exhaust-gas temperatures.

Embodiments of the internal combustion engine may also be used where at least one exhaust-gas aftertreatment system is arranged in each overall exhaust line, downstream of the turbine.

Embodiments of the internal combustion engine may be provided where at least one turbine is in the form of a wastegate turbine, a bypass line branching off from the exhaust-gas discharge system upstream of said turbine and a shut-off element being provided in the bypass line.

Embodiments of the internal combustion engine may also be used where at least one turbine has a variable turbine geometry, which permits extensive adaptation to the respective operating point by of adjustment of the turbine geometry or of the effective turbine cross section. Here, guide blades for influencing the flow direction are arranged upstream of the rotor of the turbine. In contrast to the guide blades of the rotating rotor, the guide blades do not rotate with the shaft of the turbine, that is to say with the rotor. The guide blades may be duly arranged so as to be stationary but not so as to be completely immovable, rather so as to be rotatable about their axes such that the flow approaching the rotor blades can be influenced. In contrast, if a turbine has a fixed, invariable geometry, the guide blades are not only stationary but rather also completely immovable, that is to say rigidly fixed.

Embodiments of the internal combustion engine may be provided where the turbine of the second exhaust-gas turbocharger is of larger dimensions than the turbine of the first exhaust-gas turbocharger. This embodiment expands the characteristic map range of the internal combustion engine where the second operating mode can be used toward higher engine speeds.

The cylinder head of a boosted internal combustion engine may be subject to high thermal and mechanical loading. In particular, with the integration of the exhaust manifold, the thermal loading of the internal combustion engine and of the cylinder head is increased yet further, such that increased demands are to be placed on the cooling arrangement.

Embodiments of the boosted internal combustion engine may be used where a liquid-type cooling arrangement is provided. Here, embodiments of the boosted internal combustion engine may be provided where the at least one cylinder head is equipped with at least one integrated coolant jacket. The cylinder block that can be connected to the at least one cylinder head may likewise be equipped with at least one integrated coolant jacket.

Embodiments of the boosted internal combustion engine may be provided where the at least one coolant jacket also extends between the overall exhaust lines.

The second sub-object on which the invention is based, specifically that of specifying a method for operating an applied-ignition internal combustion engine of a type described above, is achieved via a method where the activatable outlet openings of the at least two cylinders are switched in a manner dependent on load T and engine speed $n_{mot}$. Thus, the method may include switching the activatable outlet openings based on engine load and engine speed.

That which has been stated in connection with the internal combustion engine described herein likewise applies to the method described herein.

In one example, the load and/or the engine speed need not be constants, but may rather be functions of other operating parameters, for example of the exhaust-gas temperature, of the cylinder head temperature and/or of the coolant temperature. In particular, the engine speed at which switching is performed may be dependent, or made dependent, on the load, and the load at which switching is performed may be dependent, or made dependent, on the engine speed.

Embodiments of the method may be provided where, in a first operating mode,
- the at least one cylinder of the second cylinder group is deactivated,
- the at least one cylinder of the second cylinder group is deactivated by deactivation of the outlet openings, and
- the turbines of the at least two exhaust-gas turbochargers of the at least one cylinder of the first cylinder group are supplied with exhaust gas by virtue of valves belonging to the outlet openings of the at least one cylinder of the first cylinder group being actuated.

The first operating mode concerns the partial deactivation during which the cylinders of the second cylinder group are deactivated. In one example, the at least one cylinder of the first cylinder group then supplies exhaust gas not only to one turbine but to all or both turbines. In this way, the exhaust-gas back pressure in the exhaust-gas discharge system can be lowered, the charge exchange of the first cylinder group during partial deactivation can be improved, and thus the efficiency can be increased further.

In this connection, embodiments of the method may be provided where, proceeding from the first operating mode, the at least one deactivated cylinder of the second cylinder group is activated,
- the activatable outlet opening of the at least one cylinder of the first cylinder group, whose exhaust line issues into the first overall exhaust line, being deactivated, and the activatable outlet opening of the at least one cylinder of the second cylinder group, whose exhaust line issues into the second overall exhaust line, being activated, if the load exceeds a predetermined load and the engine speed is lower than a predetermined engine speed, whereby the internal combustion engine is transferred into a second operating mode where the turbine of the second exhaust-gas turbocharger is acted on with exhaust gas from the at least two cylinders of the internal combustion engine and the turbine of the first exhaust-gas turbocharger is deactivated, or
- the activatable outlet openings of the at least one cylinder of the second cylinder group being activated if the load exceeds a predetermined load and the engine speed is higher than the predetermined engine speed, whereby the internal combustion engine is transferred into a third operating mode where the turbines of the at least two exhaust-gas turbochargers are acted on with exhaust gas from the at least two cylinders of the internal combustion engine.

Embodiments of the method may be provided where, proceeding from the second operating mode,
- the activatable outlet opening of the at least one cylinder of the first cylinder group, whose exhaust line issues into the first overall exhaust line, is activated, and the activatable outlet opening of the at least one cylinder of the second cylinder group, whose exhaust line issues into the first overall exhaust line, is activated, if the engine speed exceeds a predetermined engine speed, whereby the internal combustion engine is transferred into the third operating mode.

Embodiments of the method may be implemented where, proceeding from the third operating mode,
- the activatable outlet opening of the at least one cylinder of the first cylinder group, whose exhaust line issues into the first overall exhaust line, is deactivated, and the activatable outlet opening of the at least one cylinder of the second cylinder group, whose exhaust line issues into the first overall exhaust line, is deactivated, if the engine speed falls below a predetermined engine speed, whereby the internal combustion engine is transferred into the second operating mode.

In this connection, embodiments of the method may be provided where the internal combustion engine is transferred into the first operating mode if the load falls below a predetermined load,
- proceeding from the second operating mode, the activatable outlet opening of the at least one cylinder of the first cylinder group, whose exhaust line issues into the first overall exhaust line, being activated, and the activatable outlet opening of the at least one cylinder of the second cylinder group, whose exhaust line issues into the second overall exhaust line, being deactivated, or
- proceeding from the third operating mode, the activatable outlet openings of the at least one cylinder of the second cylinder group being deactivated.

In the case of a non-boosted internal combustion engine, the exhaust-gas flow rate correlates with the engine speed. In the case of quantity regulation, the exhaust-gas flow rate increases with increasing load, even in the case of a constant engine speed. The internal combustion engine described herein may be boosted applied-ignition internal combustion engine, such that the charge pressure on the intake side must additionally be taken into consideration, in one example.

Even though the load and engine speed have been referred to above in conjunction with the method described herein, it would also be possible for the load and exhaust-gas flow rate, rather than the engine speed, to be used as a basis, in another example.

Figure 1:
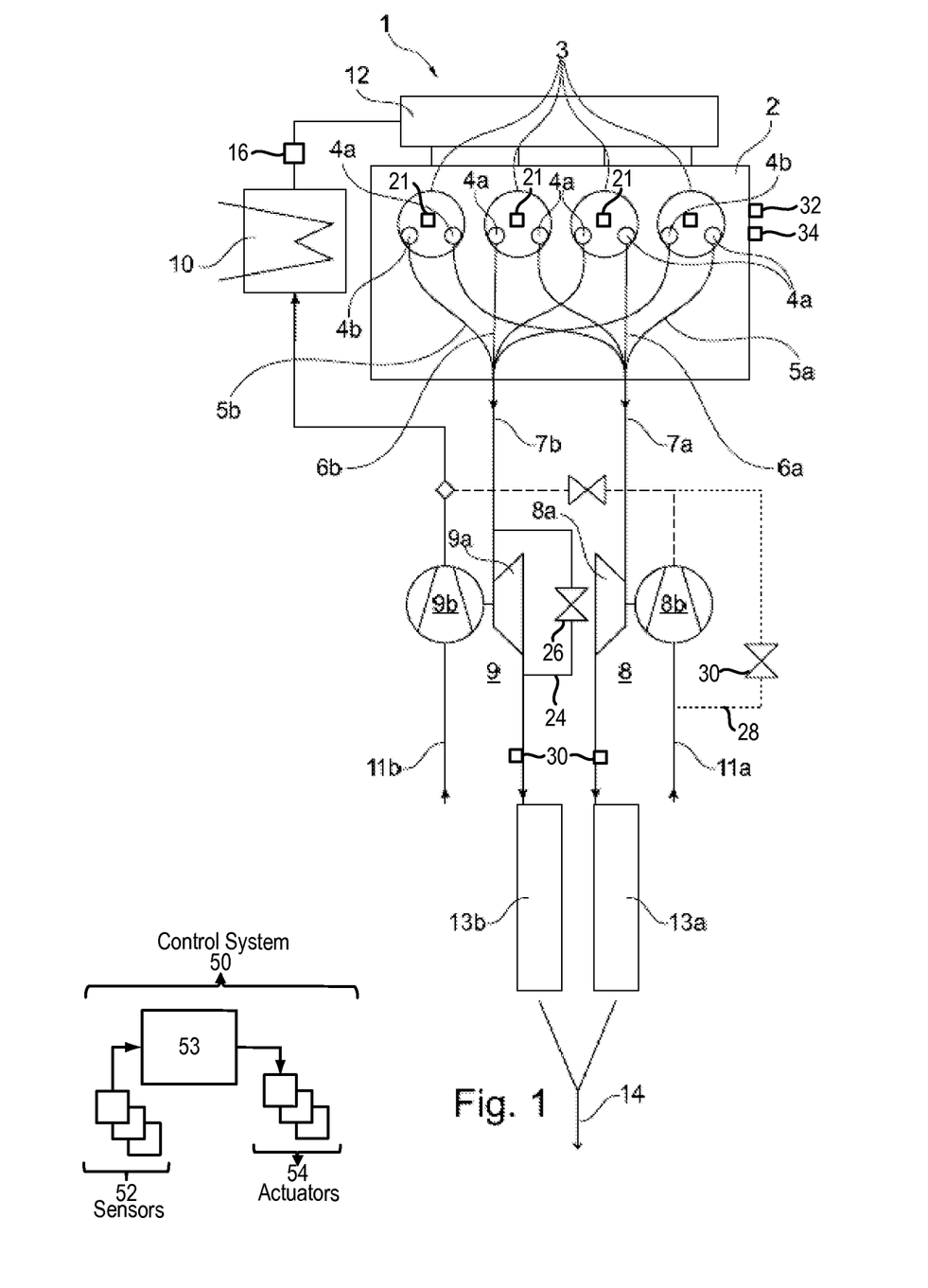
FIG. 1 schematically shows a first embodiment of an internal combustion engine.

FIG. 1 schematically shows a first embodiment of the boosted internal combustion engine 1 which is equipped with two exhaust-gas turbochargers 8, 9. Each exhaust-gas turbochargers 8, 9 includes a turbine 8a, 9a and a compressor 8b, 9b. The hot exhaust gas expands in the turbines 8a, 9a with a release of energy. The compressors 8b, 9b compress the charge air which is supplied to the cylinders 3 via intake lines 11a, 11b, charge-air cooler 10 and plenum 12, as a result of which boosting of the internal combustion engine 1 is realized. The engine 1 also includes a throttle 20 positioned downstream of the charge-air cooler 10. However, other throttle positions have been contemplated. The engine 1 may also include fuel injectors 21 supplying fuel to the cylinders 3. As shown, the fuel injectors are coupled directly to the cylinders 3. Additionally or alternatively port fuel injectors may be included in the engine 1. The fuel injectors 21 are configured to receive fuel from a fuel delivery system which may include a fuel tank, fuel pump(s), valves, etc.

In one example, one or more of the turbine 8a and 9a may be a variable geometry turbine configured to adjust the aspect ratio of the turbine depending on engine operating conditions Said internal combustion engine is a four-cylinder in-line engine 1 where the four cylinders 3 are arranged along the longitudinal axis of the cylinder head 2, that is to say in a line. However, other relative cylinder arrangements have been contemplated. For example, the cylinders in the engine may be arranged in separate cylinder banks in a V-configuration, for example.

The four cylinders 3 are configured and form two cylinder groups with in each case two cylinders 3, wherein the two inner cylinders 3 form a second cylinder group, the cylinders 3 of which are in the form of load-dependently switchable cylinders 3 which are deactivated during the course of a partial deactivation, and the two outer cylinders 3 form a first cylinder group, the cylinders 3 of which are in operation even during partial deactivation. It will be appreciated that the engine 1 may include an alternate number of cylinders in other embodiments. For example, the engine 1 may include two or eight cylinders, in other embodiments.

Each cylinder 3 has two outlet openings 4a, 4b which are adjoined by exhaust lines 5a, 5b for the discharge of the exhaust gases via an exhaust-gas discharge system, wherein all of the outlet openings 4a of the two inner cylinders 3, that is to say the outlet openings 4a of the second cylinder group, are in the form of activatable outlet openings 4a, and the two outer cylinders 3, that is to say the first cylinder group, have in each case only one activatable outlet opening 4a. However in other examples, the cylinders in the first cylinder group may have two activatable openings. Thus, the outlet openings 4b may also be activatable outlet openings, in one example.

The exhaust lines 5a, 5b of the four cylinders 3 are configured such that the exhaust line 5a of an activatable outlet opening 4a of each cylinder 3 issues into a first overall exhaust line 7a, thus forming a first exhaust manifold 6a, said first overall exhaust line being connected to the turbine 8a of the first exhaust-gas turbocharger 8, and the exhaust line 5b of the other outlet opening 4b of the four cylinders 3 merges to form a second overall exhaust line 7b, thus forming a second exhaust manifold 6b, said second overall exhaust line being connected to the turbine 9a of the second exhaust-gas turbocharger 9.

The exhaust lines 5a, 5b of the cylinders 3 merge to form two overall exhaust lines 7a, 7b such that two exhaust manifolds 6a, 6b which are integrated in the cylinder head 2 are formed. Said overall exhaust lines 7a, 7b in turn merge to form a common exhaust line 14.

A respective exhaust-gas aftertreatment system 13a, 13b is provided downstream of each turbine 8a, 9a. The exhaust-gas aftertreatment systems 13a, 13b may exhibit differences in construction and thus make allowance for the fact that the turbines 8a, 9a that are provided are at least intermittently operated with different boundary conditions, and the state variables, that is to say pressure and temperature, of the exhaust-gas stream associated with the turbines may differ significantly.

In the present case, the two overall intake lines 11a, 11b merge downstream of the compressors 8b, 9b, wherein the first compressor 8b can, in particular in a second operating mode B, be separated from the rest of the intake system in order that the second compressor 9b does not impart a delivery action into the first compressor 8b. For this purpose, there is arranged downstream of the first compressor 8b a shut-off element which serves for the deactivation of said compressor 8b. In order that the first compressor 8b does not have to impart a delivery action counter to the resistance of the closed shut-off element, a bypass line is provided where a shut-off element is likewise arranged.

The second turbine 9a is in the form of a wastegate turbine, the bypass line 24 of which branches off from the second overall exhaust line 7b upstream of the turbine 9a and issues into said overall exhaust line 7b again downstream of the turbine 9a and upstream of the exhaust-gas aftertreatment system 13b. A wastegate valve 26 is positioned in the bypass line 24. As shown, the first turbine 9b may also include a bypass line 28 and a wastegate valve 30, in one example. However, in other examples the bypass line 28 and wastegate valve 30 may be omitted from the engine 1.

The internal combustion engine 1 is configured to implement a first operating mode A which concerns the partial deactivation. During the partial deactivation, the two inner cylinders 3 of the second cylinder group are deactivated, as are the associated outlet openings 4a. Then, the two outer cylinders 3 of the first cylinder group supply exhaust gas to both turbines 8a, 9a, whereby the exhaust-gas back pressure in the exhaust-gas discharge system is lowered, and the charge exchange of the first cylinder group during partial deactivation is improved. As a result, engine efficiency is increased further. It will be appreciated that deactivation is defined as a state where the cylinder is not performing combustion operation.

In a second operating mode B, the turbine 9a of the second exhaust-gas turbocharger 9 is acted on with exhaust gas from the four cylinders 3 of the internal combustion engine 1 and the turbine 8a of the first exhaust-gas turbocharger 8 is deactivated, for which purpose those activatable outlet openings 4a of the cylinders 3 whose exhaust lines 4a issue into the first overall exhaust line 7a are deactivated.

Then, in a third operating mode C, both turbines 8a, 9a of the four cylinders 3 of the internal combustion engine 1 are acted on with exhaust gas. For this purpose, all of the activatable outlet openings 4a are activated and actuated.

The engine 1 may further include a control system 50. Control system 50 is shown receiving information from a plurality of sensors 52 (various examples of which are described herein) and sending control signals to a plurality of actuators 54 (various examples of which are described herein). As one example, sensors 52 may include exhaust gas sensors 30 located upstream of the emission control devices, temperature sensor 32, engine speed sensor 43, etc. Other sensors such as pressure, temperature, air/fuel ratio, and composition sensors may be coupled to various locations in the engine 1. As another example, the actuators 54 may include fuel injector 33, throttle 20, activatable outlet openings 4a, etc. The control system 50 may include a controller 53. The controller may receive input data from the various sensors, process the input data, and trigger the actuators in response to the processed input data based on instruction or code programmed therein corresponding to one or more routines. Exemplary control routines are described herein with regard to FIGS. 3 and 4. However, in other examples one or more of the actuators may be passively adjusted.

Figure 2:
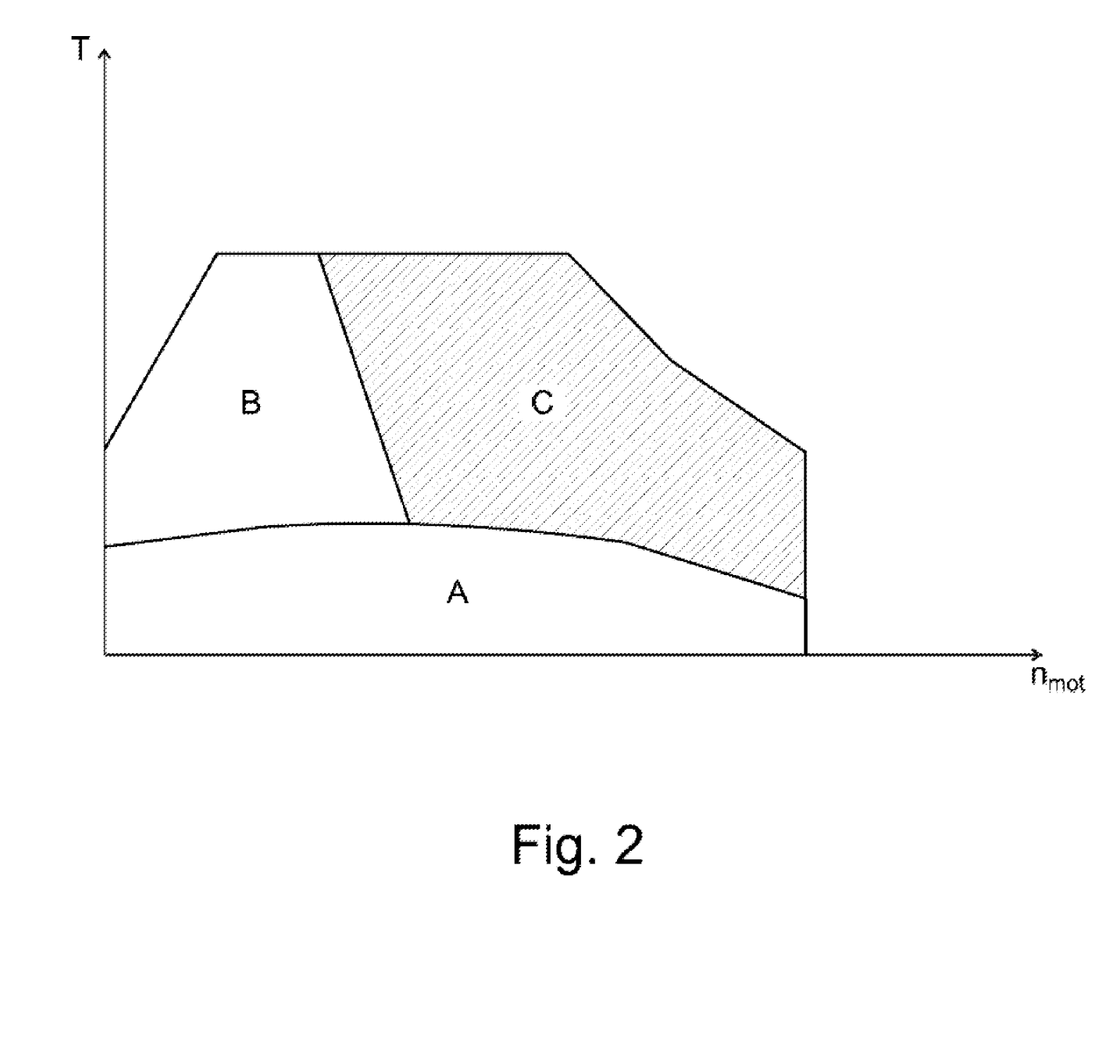
FIG. 2 schematically shows the characteristic map of a first embodiment of the internal combustion engine.

FIG. 2 schematically shows the characteristic map of the first embodiment of the internal combustion engine with the three different operating modes A, B, C, with the engine speed $n_{mot}$ being plotted on the abscissa and the load T being plotted on the ordinate. It will be appreciated that the plots of the three operating modes correspond to the operating modes discussed above with regard to FIG. 1. However, the plots are exemplary in nature and plots with different boundaries have been contemplated.

It can be seen that the engine speed $n_{mot}$ at which switching is performed is dependent on the load T, and the load T at which switching is performed is dependent on the engine speed $n_{mot}$. Specifically, when the load increases the engine may switch into the $2^{nd}$ or $3^{rd}$ mode. Likewise when the load decreases the engine may switch into the $1^{st}$ mode. Furthermore, when the engine is in the second mode and the speed increases the engine may switch into the $3^{rd}$ mode.

Figure 3:
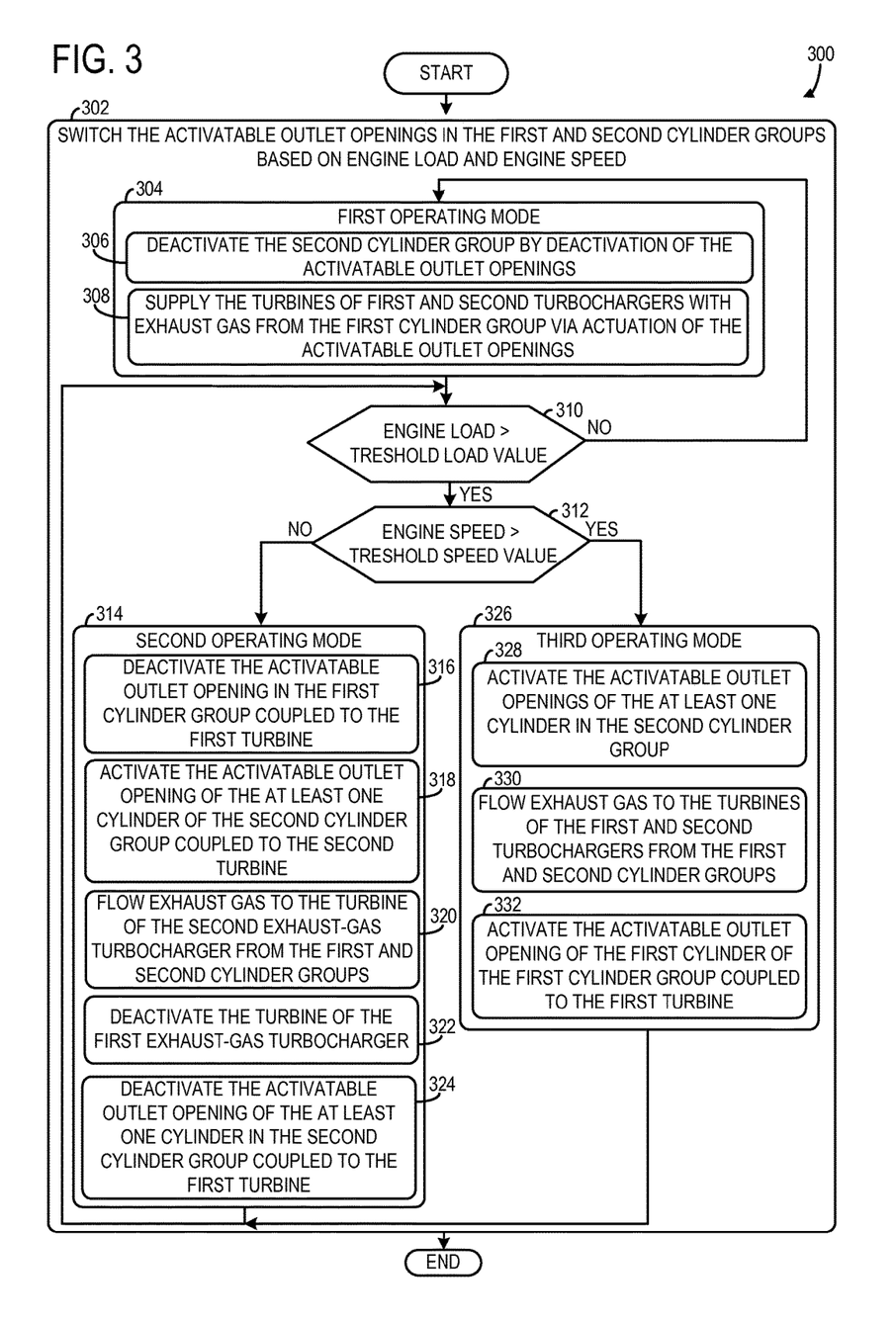
FIG. 3 shows a method for operation of a boosted applied-ignition internal combustion engine.

FIG. 3 shows a method 300 for operation of operating a boosted applied-ignition internal combustion engine. The method 300 may be implemented via the internal combustion engine 1 discussed above with regard to FIG. 1. Therefore in one example, the engine may include at least one cylinder in a first cylinder group and at least one cylinder in a second cylinder group, each of the cylinders in the first and second cylinder groups having two activatable outlet openings adjoined by an exhaust line, one of the activatable outlet openings of each of the first and second cylinders coupled to a first turbocharger including a first turbine and one of the activatable outlet openings of each of the cylinders coupled to a second turbocharger including a second turbine. However, in other examples alternate suitable internal combustion engines may be utilized.

At 302 the method includes switching the activatable outlet openings in the first and second cylinder groups based on engine load and engine speed.

Step 302 may include block 304-332. At 304 the method includes implementing a first operating mode. In the first operating mode the method may include steps 306-308. At 306 the method includes deactivating the second cylinder group by deactivation of the activatable outlet openings and at 308 the method includes supplying the turbines of first and second turbochargers with exhaust gas from the first cylinder group via actuation of the activatable outlet openings. In one example, implementing the first operating mode may further includes deactivation of one of the activatable outlet openings in the first cylinder group and activating one of the activatable outlet openings in the first cylinder group.

At 310 the method includes determining if an engine load is greater than a predetermined threshold load value. If it is determined that the engine load is not greater than the predetermined threshold load value (NO at 310) the method returns to 304. However, if it is determined that the engine load is greater than the predetermined threshold value (YES at 310) the method advances to 312.

At 312 the method includes determining if an engine speed is greater than a predetermined threshold speed value. If it is determined that the engine speed is not greater than the predetermined threshold speed value (NO at 312) the method advances to 314. At 314 the method includes implementing a second operating mode. Implementing a second operating mode may include steps 316-324. At 316 the method includes deactivating the activatable outlet opening in the first cylinder group coupled to the first turbine. At 318 the method includes activating the activatable outlet opening of the at least one cylinder of the second cylinder group coupled to the second turbine. At 320 the method includes flowing exhaust gas to the turbine of the second exhaust-gas turbocharger from the first and second cylinder groups. Next at 322 the method includes deactivating the turbine of the first exhaust-gas turbocharger. At 324 the method includes deactivating the activatable outlet opening of the at least one cylinder in the second cylinder group coupled to the first turbine. It will be appreciated that one or more of the steps 316-324 may be omitted when implementing the second operating mode depending on the prior configuration of the engine.

However, if it is determined that the engine speed is greater than the predetermined threshold speed value (YES at 312) the method advances to 326. At 326 the method includes implementing a third operating mode. Implementing the third operating mode may include step 328-332. At 328 the method includes activating the activatable outlet openings of the at least one cylinder in the second cylinder group. Next at 330 the method includes flowing exhaust gas to the turbines of the first and second turbochargers from the first and second cylinder groups. At 332 the method includes activating the activatable outlet opening of the first cylinder of the first cylinder group coupled to the first turbine. It will be appreciated that one or more of the steps 328-332 may be omitted when implementing the third operating mode depending on the prior configuration of the engine.

Figure 4:
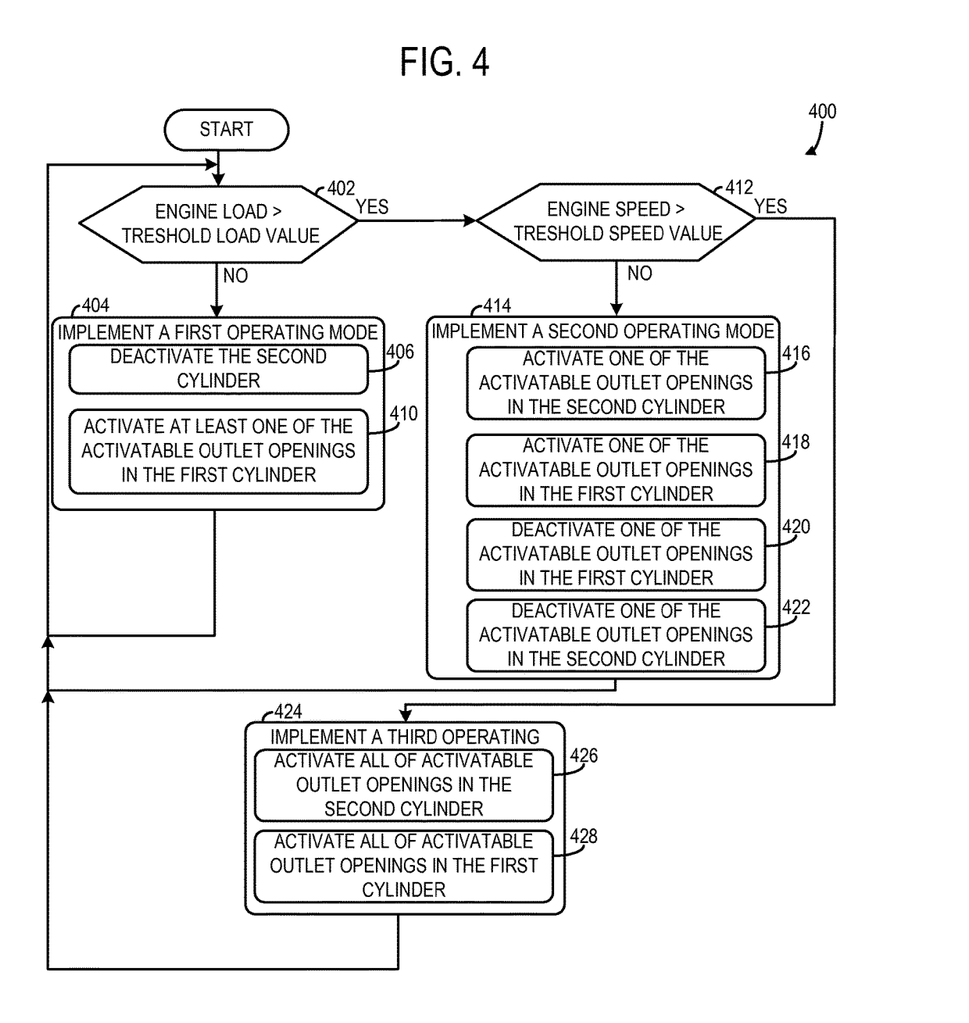
FIG. 4 shows another method for operation of a boosted internal combustion engine.

FIG. 4 shows a method 400 for operation of operating a boosted applied-ignition internal combustion engine. The method 400 may be implemented via the internal combustion engine 1 discussed above with regard to FIG. 1. Therefore in one example, the engine may include a first cylinder in a first cylinder group and a second cylinder in a second cylinder group, each of the first and second cylinders having two activatable outlet openings adjoined by an exhaust line, one of the outlet openings of each of the first and second cylinders coupled to a first turbocharger including a first turbine and one of the outlet openings of each of the cylinders coupled to a second turbocharger including a second turbine. However, in other examples alternate suitable internal combustion engines may be utilized.

At 402 the method includes determining if an engine load is greater than a predetermined threshold value. If it is determined that the engine load is not greater than a threshold value (NO at 402) the method advances to 404. At 404 the method includes implementing a first operating mode. Implementing the first operating mode may include steps 406-410. At 406 the method includes deactivating the second cylinder. Deactivating the second cylinder may include deactivating all of the outlet openings in the second cylinder. At 410 the method includes activating at least one of the activatable outlet openings in the first cylinder. In one example, step 410 may include activating all of the activatable outlet openings in the first cylinder. However, in other examples only one of the activatable outlet openings in the first cylinder may be activated at step 410. It will be appreciated that depending on the preceding state of the engine activating and deactivating the outlet openings may include sustaining activation and/or deactivation of the outlet openings. After 404 the method returns to 402. In one example, the first turbine may include a wastegate valve and in such an example implementing the first operating mode may include operating the wastegate valve based on engine speed. In another example, the implementing first operating mode may include flowing exhaust gas from the activatable outlet openings in the first cylinder to the first turbine and second turbines.

At 412 the method includes determining if the engine speed is greater than a predetermined threshold speed value. If it is determined that the engine speed in not greater than the predetermined threshold speed value (NO at 412) the method advances to 414. At 414 the method includes implementing a second operating mode. Implementing the second operating mode may include steps 416-422. At 416 the method includes activating one of the activatable outlet openings in the second cylinder. At 418 the method includes activating one of the activatable outlet openings in the first cylinder. Next at 420 the method includes deactivating one of the activatable outlet openings in the first cylinder and at 422 the method includes deactivating one of the activatable outlet openings in the second cylinder. It will be appreciated that depending on the prior state of the engine activating and deactivating the outlet openings may include sustaining activation and/or deactivation of the outlet openings. After 414 the method returns to step 402.

If it is determined that the engine speed in greater than the predetermined threshold speed value (YES at 412) the method advances to 424. At 424 the method includes implementing a third operating mode. Implementing the third operating mode may include steps 426-428. At 426 the method includes activating all of the activatable outlet openings in the second cylinder and at 428 activating all of the activatable outlet openings in the first cylinder. After 424 the method returns to 402. It will be appreciated that depending on the prior state of the engine activating the outlet openings may include sustaining activation of the outlet openings.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a boosted applied-ignition internal combustion engine including at least one cylinder in a first cylinder group and at least one cylinder in a second cylinder group, each of the cylinders in the first and second cylinder groups having two activatable outlet openings adjoined by an exhaust line, one of the activatable outlet openings of each of the first and second cylinders coupled to a first turbocharger including a first turbine and one of the activatable outlet openings of each of the cylinders coupled to a second turbocharger including a second turbine, the method comprising:

in a first operating mode, when the boosted applied-ignition internal combustion engine is operating below a predetermined threshold load and when engine speed is above or below a predetermined engine speed,
deactivating the second cylinder group by deactivation of the activatable outlet openings in the at least one cylinder in the second cylinder group; and
supplying the first and second turbines with exhaust gas from the first cylinder group via actuation of the two activatable outlet openings in the at least one cylinder in the first cylinder group;

in a second operating mode, when engine load exceeds the predetermined threshold load and when engine speed is lower than the predetermined engine speed,
deactivating the activatable outlet opening in the at least one cylinder in the first cylinder group and coupled to the first turbine;
activating the activatable outlet opening in the at least one cylinder of the second cylinder group and coupled to the second turbine; and
flowing exhaust gas to the second turbine from the first and second cylinder groups; and in a third operating mode, when the engine load exceeds the predetermined threshold load and when engine speed is higher than the predetermined engine speed,
activating the activatable outlet openings in the at least one cylinder in the second cylinder group and coupled to the first turbine; and
flowing exhaust gas to the first and second turbines from the first and second cylinder groups.

2. The method of claim 1, when transferring the engine into the second operating mode proceeding from the third operating mode, the second operating mode includes:
deactivating the activatable outlet opening of the first cylinder of the first cylinder group coupled to the first turbine; and
deactivating the activatable outlet opening of the second cylinder of the second cylinder group coupled to the first turbine.

3. A method for operating a boosted engine including a first cylinder in a first cylinder group and a second cylinder in a second cylinder group, each of the first and second cylinders having two activatable outlet openings adjoined by an exhaust line, one of the outlet openings of each of the first and second cylinders coupled to a first turbocharger including a first turbine and one of the outlet openings of each of the first and second cylinders coupled to a second turbocharger including a second turbine, comprising:

in response to engine load dropping below a threshold load value when engine speed is above or below a predetermined engine speed, implementing a first operating mode that includes,
  deactivating the second cylinder; and
  activating the two activatable outlet openings in the first cylinder; and
in response to engine load exceeding the threshold load value and when the engine speed is lower than the predetermined engine speed, implementing a second operating mode that includes,
  sustaining activation of the activatable outlet opening in the first cylinder coupled to the second turbine;
  activating the activatable outlet openings in the second cylinder coupled to the second turbine;
  deactivating the activatable outlet opening in the first cylinder coupled to the first turbine; and
  sustaining deactivation of the activatable outlet opening in the second cylinder coupled to the first turbine.

4. The method of claim 3, further comprising, if the engine load is greater than the threshold load value and the engine speed greater than the predetermined engine speed, implementing a third operating mode that includes,
  sustaining activation of the activatable outlet opening in the first cylinder and coupled to the second turbine;
  sustaining activation of the activatable outlet opening in the second cylinder and coupled to the second turbine;
  activating the deactivated activatable outlet opening in the second cylinder and coupled to the first turbine; and
  activating the deactivated activatable outlet opening in the first cylinder and coupled to first turbine.

5. The method of claim 3, further comprising, in the first operating mode, flowing exhaust gas from the activatable outlet openings in the first cylinder to each of the first turbine and the second turbine.

6. The method of claim 3, where the first turbine includes a wastegate valve and the method includes operating the wastegate valve based on engine speed in the first operating mode.

* * * * *